(12) United States Patent
Wright

(10) Patent No.: US 6,507,926 B1
(45) Date of Patent: Jan. 14, 2003

(54) MITIGATION OF FALSE CO-CHANNEL UPLINK RECEPTION IN A PROCESSING SATELLITE COMMUNICATION SYSTEM USING STAGGER

(75) Inventor: David A. Wright, Solana Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/270,572

(22) Filed: Mar. 16, 1999

(51) Int. Cl.$^7$ .................. H03M 13/15; H04B 7/185
(52) U.S. Cl. .................. 714/776; 370/324; 370/328
(58) Field of Search ..................... 714/776; 370/324, 370/328

(56) References Cited

U.S. PATENT DOCUMENTS

| | | | | |
|---|---|---|---|---|
| 3,818,442 A | * | 6/1974 | Solomon .................. 340/146.1 |
| 4,644,534 A | * | 2/1987 | Sperlich ....................... 370/95 |
| 5,745,484 A | * | 4/1998 | Scott .......................... 370/347 |
| 5,951,709 A | * | 9/1999 | Tanaka ....................... 714/755 |
| 5,991,598 A | * | 11/1999 | Nawata ...................... 455/13.1 |
| 6,031,846 A | * | 2/2000 | Gurusami et al. .......... 370/508 |
| 6,091,936 A | * | 7/2000 | Chennakeshu et al. ....... 455/63 |
| 6,138,261 A | * | 10/2000 | Wilcoxson et al. .......... 714/755 |
| 6,201,967 B1 | * | 3/2001 | Goerke ....................... 455/435 |
| 6,223,040 B1 | * | 4/2001 | Dam ........................... 455/447 |
| 6,240,083 B1 | * | 5/2001 | Wright et al. ................ 370/348 |

* cited by examiner

Primary Examiner—Stephen M. Baker
(74) Attorney, Agent, or Firm—McAndrews, Held & Malloy, Ltd.

(57) ABSTRACT

The present invention provides a method and apparatus for preventing show-thru (and therefore misinsertion of unintended traffic) among uplink beams transmitted to a satellite. The method includes the steps of selecting (402) an uplink A stagger value, selecting an uplink B stagger value, coding (404) uplink A data to generate coded uplink A data, and coding (406) uplink B data to generate coded uplink B data. Subsequently, the method transmits (412) the coded uplink A data, staggered by the uplink A stagger value, in the uplink A and further transmits (414) the coded uplink B data, staggered by the uplink B stagger value, in the uplink B. During coding (404, 406), the method may use a full length error correcting code capable of correcting t errors. In such a case, the method generally selects an uplink B stagger value differing from the uplink A stagger value by more than t codeword symbols. Alternatively, the method, during coding (404, 406), may use a shortened error correcting code capable of correcting t errors. In such a case, the method generally selects an uplink B stagger value differing from the uplink A stagger value by at least one codeword symbol. The method is not limited to any particular number of uplink beams and may provide staggering for all same color uplink beams in a predetermined reuse pattern, for example.

13 Claims, 4 Drawing Sheets

MITIGATION OF FALSE CO-CHANNEL UPLINK RECEPTION IN A PROCESSING SATELLITE COMMUNICATION SYSTEM USING STAGGER

BACKGROUND OF THE INVENTION

The present invention relates to mitigation of false co-channel uplink reception (also known as "show-thru") in a satellite communication system. In particular, the present invention relates to staggering data transmissions in uplink beams to allow a receiving satellite to reliably discard show-thru signals.

A multi-beam satellite system may transmit and receive numerous beams distinguished by the frequency and polarization of the signals present in the beam. The same frequency, same polarization beams (i.e., the same "color" beams) may be reused in an antenna pattern to provide communications services across a coverage area often hundreds of miles in diameter.

Beam reuse, however, renders the same color beams susceptible to co-channel interference such that a portion of the signal from a beam B is observed in a beam A. Such co-channel interference (CCI) arises primarily because of the practical limitations in implementing an antenna system which, ideally, would provide perfect rejection of same-color signals from other than the desired beam. In practice, however, the coverage provided for beam A inevitably provides some response to signals originating in beam B due to real world limitations in the physical realization of the antenna system. Furthermore, in typical frequency reuse systems, 12, 16, or more beams of the same color may be reused over a coverage area, correspondingly increasing the potential for CCI in any one of the beams.

Processing satellite systems may further employ TDMA (time division multiple access) techniques that permit several user earth terminals to time share a frequency channel by sending short traffic bursts in assigned time slots. These bursts typically exploit powerful error correcting codes to ensure the integrity of the traffic being carried. However, when the time slots in two same-color beams, A & B, are time aligned, a phenomenon known as show-thru may occur.

Specifically, show-thru may occur in beam A when no burst is present in a time slot in beam A but a burst is present in the matching channel (frequency) and time slot in beam B. As a result of CCI, the burst from beam B couples (albeit in attenuated form) into the receiving electronics for beam A. Although the signal to noise ratio of this inadvertently coupled signal may be quite low, the error correcting code applied to the burst in beam B improves the likelihood that the burst from B will be regarded as valid by the processor for beam A.

In systems intended for use with the ATM (Asynchronous Transfer Mode) protocol, the inadvertent presence of apparently valid, but actually misinserted cells (due to show-thru) is deleterious since the cell misinsertion rate (CMR) must be kept very low to minimize the potential for confusion at higher layers of the ATM communications protocol. Furthermore, show-thru presents, in general, a security threat to the information in the uplink burst for beam B. In other words, neighboring quiescent channels may actually decode (and ultimately send to unintended recipients) an uplink burst intended for a completely different receiver. Show-thru thus undesirably and unnecessarily utilizes satellite resources, permits unauthorized usage of uplink beams, and compromises the security in the transmitted data.

Therefore, a need is present in the industry for an improved satellite communications system which overcomes the disadvantages discussed above and previously experienced.

BRIEF SUMMARY OF THE INVENTION

It is an object of the present invention to greatly reduce the likelihood of successfully decoding show-thru signals.

Another object of the present invention is to provide a simple and effective method of reliably discarding show-thru signals at a receiver.

It is another object of the present invention to greatly reduce the likelihood of successfully decoding show-thru signals without adding overhead to uplink bursts.

Yet another object of the present invention is to use the cyclic nature of error correcting codes in a staggered transmission system to reliably discard show-thru signals at a receiver.

One or more of the foregoing objects is met in whole or in part by a method and apparatus for preventing show-thru among uplink beams transmitted to a satellite. The method includes the steps of selecting an uplink A stagger value, selecting an uplink B stagger value, coding uplink A data to generate coded uplink A data, and coding uplink B data to generate coded uplink B data. Subsequently, the method transmits the coded uplink A data, staggered by the uplink A stagger value, in the uplink A and further transmits the coded uplink B data, staggered by the uplink B stagger value, in the uplink B.

Additionally, a predetermined set of staggering values for each same color uplink beam in a predetermined reuse plan may be generated. The staggering values may then be distributed among the user earth terminals generating the uplinks in the reuse plan. During coding, the method may use a full length error correcting code capable of correcting t errors. In such a case, the method generally selects an uplink B stagger value differing from the uplink A stagger value by more than t codeword symbols. For example, the uplink A stagger value may be zero and the uplink B stagger value may be t+1.

Alternatively, the method, may use a shortened error correcting code capable of correcting t errors. In such a case, the method generally selects an uplink B stagger value differing from the uplink A stagger value by at least one codeword symbol. However, a difference in staggering value of more than t codeword symbols is also appropriate. The method is not limited to any particular number of uplink beams and thus, for example, the method may also select an uplink C stagger value differing from the uplink A stagger value and differing from the uplink B stagger value, code the uplink C data, and transmit the uplink C data staggered by the uplink C stagger value, in a separate uplink C.

DETAILED DESCRIPTION OF THE INVENTION

Figure 1:
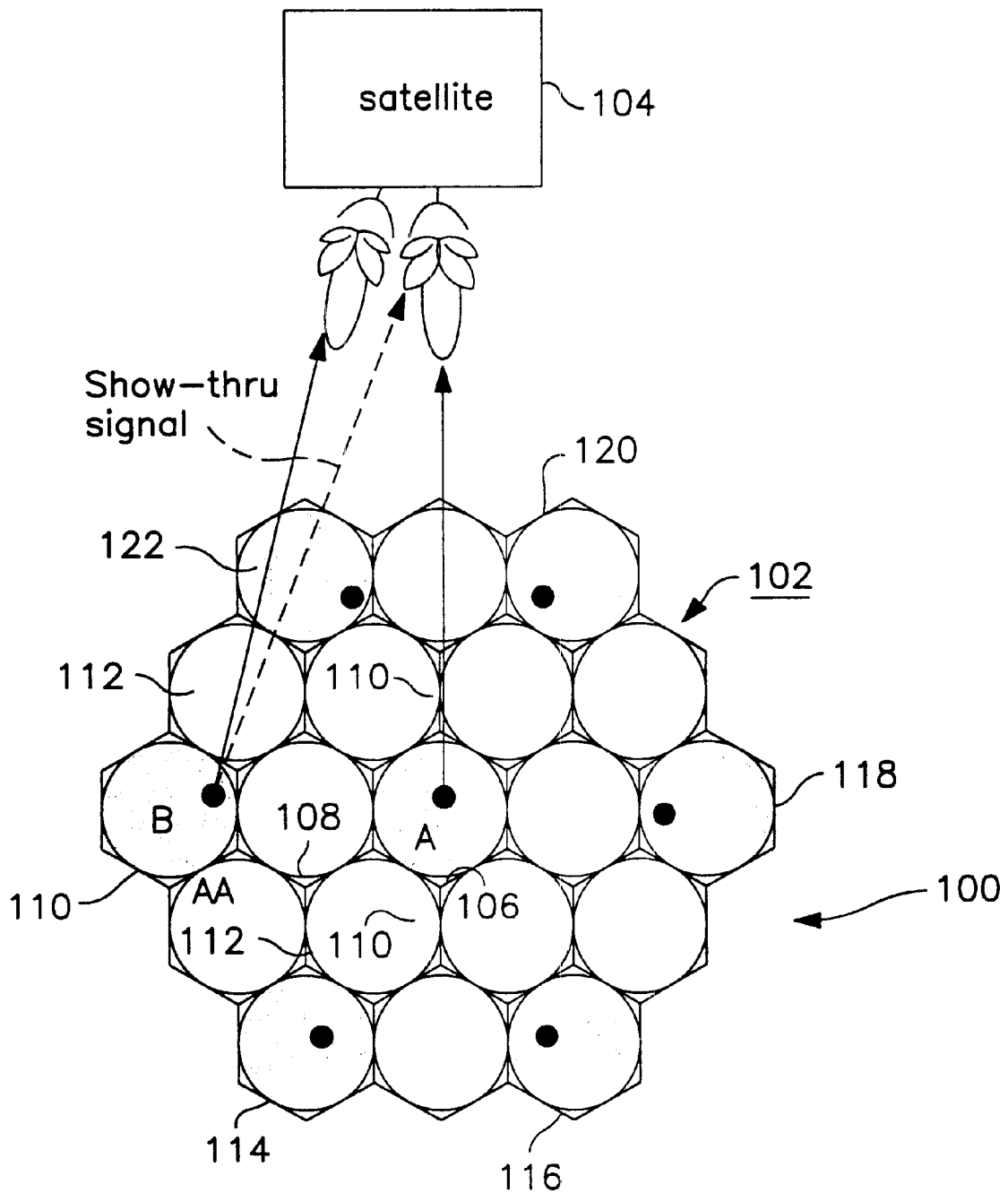
FIG. 1 illustrates an example of a frequency reuse plan susceptible to show-thru.

Turning now to the drawings, FIG. 1 illustrates a satellite cellular communication system 100 including a frequency reuse plan 102 generated by a satellite 104. The frequency reuse plan 102 may make use of multiple frequencies and polarizations (for example, differently colored beams A and A* in FIG. 1) to reduce interference between cells. The reuse plan 102 includes multiple cells 106–112, for example, that correspond to spot beams separately transmitted (as a downlink) and received (as an uplink) by the satellite 104 and received and transmitted by user earth terminals (UETs).

FIG. 1 shows that multiple identically colored beams may exist in the frequency reuse plan 102. For example, the cells 106 (supported by beam A) and 110 (supported by beam B) share the same color and are therefore candidates for CCI and show-thru. Furthermore, it is noted that there may be numerous additional same color cells in the frequency reuse plan 102. For example, the cells 114–122 all share the same color as the cells 108 and 110. Thus, although the discussion below proceeds with reference to beams A and B, it is noted that the techniques discussed below are also applicable to numerous additional same color beams in any frequency reuse plan.

Figure 2:
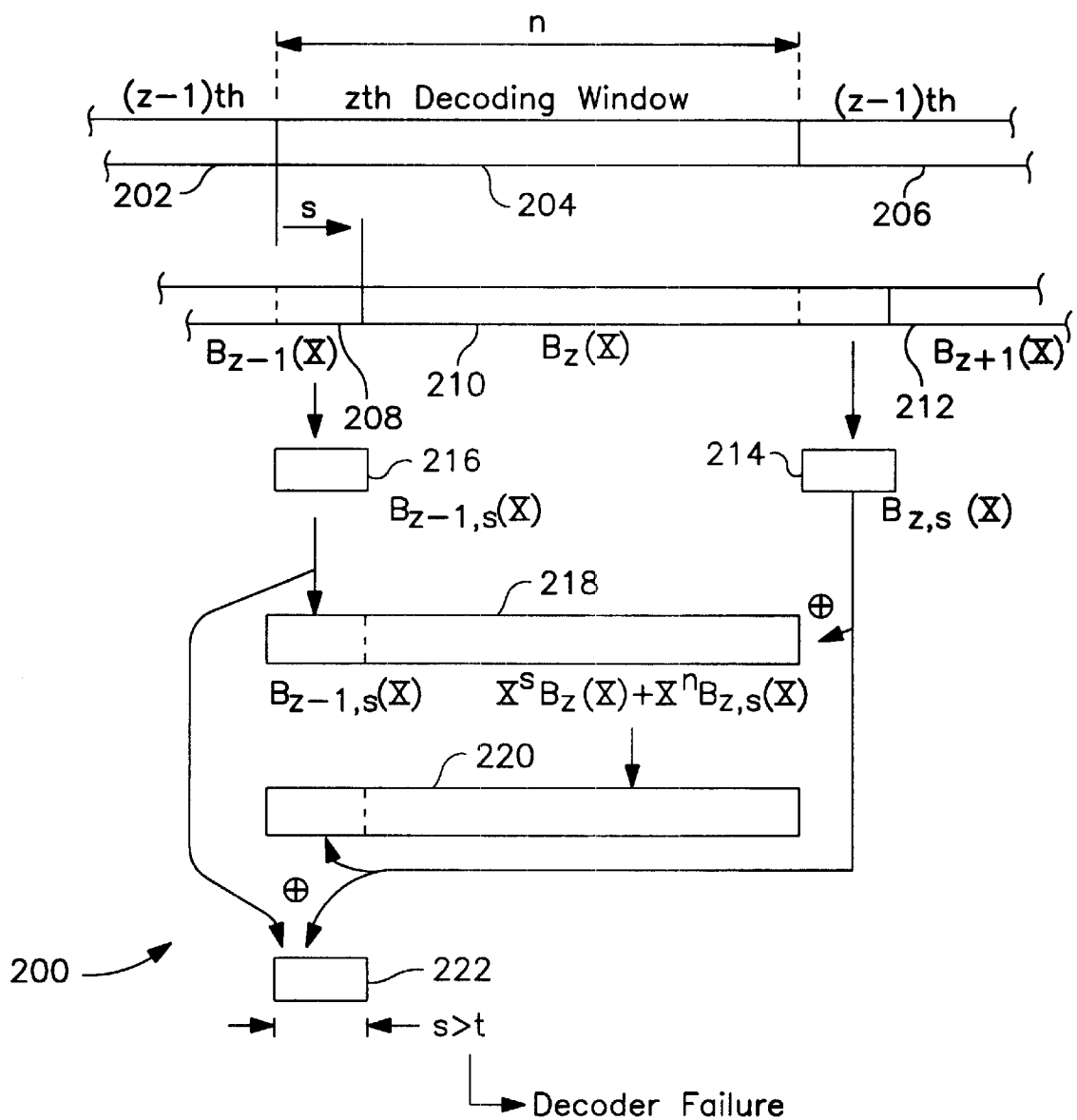
FIG. 2 illustrates the codeword processed during an uplink A decoding epoch due to show-thru reception of a staggered uplink B codeword.

Before proceeding to FIG. 2, it is noted that satellite communication signals typically employ highly effective error correction codes. For example, a concatenated code may be applied to a raw data word before transmission. The concatenated coding process typically applies a first (outer) block code followed by a second (inner) convolutional code. The block code may, for example, be a Reed-Solomon block code.

As will be discussed in more detail below, the present invention is useful with Reed-Solomon codes or any other cyclic codes, either using a full codeword or a shortened codeword. A Reed-Solomon block code is typically specified using a pair of numbers (n, k), where n represents the total length of a codeword ($n=2^v-1$ for an integer v), and k represents the number of information bytes in the codeword ($k=n-2*t$ where t is the number of (byte) errors the code can correct). As examples, the present invention may be used with a (255, 231) Reed-Solomon code or a shortened (236, 212) Reed-Solomon code. In both cases t=12.

The present invention exploits the cyclic property of codewords. With cyclic codewords, including, for example Reed-Solomon codewords, a cyclic permutation of the symbols in one codeword generates a new codeword. The cyclic property, as explained in more detail below, may be used in both full length and shortened codewords to greatly reduce show-thru.

Turning now to FIG. 2, that figure shows a data diagram 200 of show-thru reception in uplink A of a staggered codeword from uplink B. The following notation is used below and in the figures:

| Term | Explanation |
| --- | --- |
| z | The current decoding epoch (i.e., the time during which the $z^{th}$ codeword in uplink A is being decoded) |
| $A_z(X)$ | The observable processed by the uplink A receiver during the uplink A epoch z. |
| $B_z(X)$ | The codeword transmitted in uplink B during uplink B epoch z. |

-continued

| Term | Explanation |
| --- | --- |
| $B_{z,m}$ | The $m^{th}$ byte of the uplink B epoch z codeword. |
| $B_{z,s}(X)$ | An s byte segment of uplink B epoch z codeword. |
| $*X^n$ | Polynomial multiplication by $X^n$ (i.e., codeword shifting by n positions). |
| $\oplus$ | Galois Field addition (e.g., exclusive-or, XOR). Note that $\oplus$ is its own inverse. |

FIG. 2 illustrates uplink A decoding windows z−1 (reference 202), z (reference 204), and z+1 (reference 206), each n bytes in length. FIG. 2 also illustrates uplink B transmission epochs z−1 (reference 208), z (reference 210), and z+1 (reference 212). The missed codeword symbols 214 and the substituted codeword symbols 216 are also illustrated. The data received in uplink A during epoch z is shown both as an observable 218 and a codeword plus errors 220. The resultant error pattern syndrome 222 induced by the stagger is also illustrated.

Note that in FIG. 2, the uplink B codewords are staggered by s codeword symbols from the uplink A codewords. In other words, the uplink B codewords are delayed during transmission (i.e., arrive "late" during show-thru in the receiver for uplink A). While it may also be said that uplink A codewords, rather, are early with respect to uplink B codewords, the primary importance is not in relative terms like "early" or "late", but in the concept of staggering to prevent uplink codewords (among any number of beams) from arriving in coextensive decoding windows. In other words, the uplink A observable 218 will encompass portions of two codewords from beam B.

Consider first a stagger of 1, for example, in which an uplink B codeword arrives one code symbol late relative to the uplink A decoding window z. Thus, in the $z^{th}$ decoding epoch for A, the input to the decoder includes the last symbol from the uplink B z−1 epoch codeword and n−1 following symbols from the uplink B epoch z codeword. The observable presented to the uplink A decoder for the $z^{th}$ epoch may, then, be expressed in polynomial form as:

$$A_z(X)=B_{z-1,n-1}*X^0 \oplus X*B_z(X) \oplus B_{z,n-1}*X^n \qquad (1)$$

The first term in the right hand side (rhs) of equation (1) indicates that the last component (i.e., the high order term) of the uplink B epoch z−1 codeword appears as the low order term in the uplink A decoding window. The last term in the rhs cancels the high order term of the uplink B epoch z codeword (which will subsequently appear in the uplink A epoch z+1 decoding window 206).

The middle term of equation (1) is the uplink B epoch z codeword, $B_z(X)$, shifted up by one position by the multiplication by X. Because Reed-Solomon codes are cyclic, a shift by one, together with a carry around of the high order term $B_{z,n-1}$ to the low order position, forms a new codeword. That is:

$$C(X)=B_{z,n-1}*X^0 \oplus X^1*B_z(X) \oplus B_{z,n-1}*X^n \qquad (2)$$

is a codeword. Thus, equation (1) may be rewritten as:

$$A_z(X)=(B_{z-1,n-1} \oplus B_{z,n-1})*X^0 \oplus C(X) \qquad (3)$$

Equation (3) asserts that, when the uplink B codeword is staggered one codeword symbol late relative to the uplink A codewords, the result appears to the uplink A decoder as a codeword with a possible error in position 0. In other words, $A_z(X)$ is formed from n−1 codeword symbols of the staggered $B_z(X)$ (these match another codeword) and a potential error in the low order codeword symbol. The error has a magnitude of $(B_{z-1,n-1} \oplus B_{z,n-1})$, which is the XOR of the high order components of the uplink B epoch z−1 codeword and the uplink B epoch z codeword. Although an error is possible, it is not necessarily present due to the fact that $B_{z-1,n-1}$ and $B_{z,n-1}$ may be equal (in which case $B_{z-1,n-1} \oplus B_{z,n-1}=0$). Assuming that $B_{z-1,n-1}$ and $B_{z,n-1}$ are independent, equally likely, random variables, the probability that they are equal is only $2^{\wedge}(-v)$, or 1 in 256 for the case where v=8.

Regardless of whether $B_{z-1,n-1}$ and $B_{z,n-1}$ are equal, the observable $A_z(X)$ will decode satisfactorily in a t error correcting Reed-Solomon decoder because the observable contains at most a single error. In other words, at most, one byte is in error (neglecting noise and other sources of interference) although the byte may be in error in many bits.

With reference again to FIG. 2, consider now the case where the uplink B codewords are staggered s codeword symbols late with respect to the uplink A codewords. Equation (1) may be rewritten as $$A_z(X)=B_{z-1,s}(X)*X^{\wedge}0 \oplus X^{\wedge}s*B_z(X) \oplus B_{z,s}(X)*X^{\wedge}n \quad (4)$$

In FIG. 2, the observable $A_z(X)$ 218 is thus formed from the s codeword symbols from the uplink B z−1 epoch codeword, followed by n−s codeword symbols from the uplink B epoch z codeword. In other words, the high order s codeword symbols from the uplink B epoch z codeword are lost (and represent, for example, missed codeword symbols 214) and the high order s codeword symbols from the uplink B epoch z−1 form part of the uplink A observable 218 (and represent, for example, the substituted codeword symbols 216). The uplink A observable $A_z(X)$ represents a codeword plus errors 220 presented to the uplink A decoder, with a corresponding error syndrome 222.

Using a similar line of argument to that used for the s=1 case discussed above, $$C(X)=B_{z,s}(X)*X^{\wedge}0 \oplus X^{\wedge}s*B_z(X) \oplus B_{z,s}(X)*X^{\wedge}n \quad (5)$$

Equation (5) shows the cyclic principle applied to a shift of s symbols: that is if $B_z(X)$ is shifted s times, with end around carry, the result is another codeword. Equation (4) may then be rewritten in the form $$A_z(X)=(B_{z-1,s}(X) \oplus B_{z,s}(X))*X^{\wedge}0 \oplus C(X) \quad (6)$$

Thus, in equation (6), the uplink A observable 218 takes the form of a codeword plus an apparent error term E(X) (the error syndrome 222) which is the sum of two byte segments or, equivalently, polynomials each of degree less than s:

$$E(X)=B_{z-1,s}(X) \oplus B_{z,s}(X) \quad (7)$$

The two segment polynomials, $B_{z-1,s}(X)$ and $B_{z,s}(X)$, when formed from independent, equally probable, codeword symbols dictate that E(X) will have terms that are non-zero with probability $1-2^{\wedge}(-v)$ or 255/256 for v=8. Stated another way, the effect of an s codeword symbol stagger is to produce, with near certainty, an apparent error pattern of s or fewer symbols during show-thru.

If s is no greater than t, then the error correcting properties of the code allow the uplink A decoder to expurgate the apparent errors. However, when s exceeds t, the uplink A decoder will, with very high probability, be unable to decode the error polynomial and will assert a decoder failure. Thus decoder failure may be used to discard uplink A observables present due to show-thru from the uplink B. In other words, show-thru is prevented, with a very high probability, when the uplink B is staggered by more than t codeword symbols from other uplinks, including the uplink A.

As a quantitative example, consider the case where a byte oriented Reed-Solomon code is used (e.g., over a 256 element Galois Field GF(256)) of length 255 bytes and capable of correcting any 12 byte errors (t=12). A potential show-thru uplink B codeword (presented as an uplink A observable) reaches the uplink A decoder with 13 or more of its 255 (byte) symbols in error when the stagger is 13 or more codewords between the uplink A and the uplink B. When 13 or more errors are present in the uplink A observable, the probability that the uplink A Reed-Solomon decoder will not produce a decode failure is less than 1.5 parts per billion. This probability is consistent with the typical requirement for Cell Misinsertion Ratio (CMR) in an ATM network and, as a result, allows satellites to reliably receive and process ATM cells.

Equations (4) through (7) above may be modified for the case where the stagger is early. The corresponding equations (8) through (11) are presented below:

$$A_z(X)=B_{z,s}(X)*X^{\wedge}-s \oplus X^{\wedge}-s*B_z(X) \oplus B_{z+1,s}(X)*X^{\wedge}(n-s) \quad (8)$$

$$C(X)=B_{z,s}(X)*X^{\wedge}-s \oplus X^{\wedge}-s*B_z(X) \oplus B_{z,s}(X)*X^{\wedge}(n-s) \quad (9)$$

$$A_z(X)=C(X) \oplus (B_{z,s}(X) \oplus B_{z+1,s}(X))*X^{\wedge}(n-s) \quad (10)$$

$$E(X)=(B_{z,s}(X) \oplus B_{z+1,s}(X))*X^{\wedge}(n-s) \quad (11)$$

Equation (8) reveals that the observable at the uplink A decoder is comprised of the uplink B epoch z codeword, excluding the first s codeword symbols (which are designed $B_{z,s}(X)$), together with the first s codeword symbols of the uplink B epoch z+1 codeword, denoted $B_{z+1,s}(X)$. Equation (9) shows that $B_{z,s}(X)$, shifted cyclicly by s codeword symbols (in the opposite direction to the previous discussion with respect to equation (5), is also a codeword. Equation (10) illustrates that the uplink A observable $A_z(X)$ may be considered a codeword having some additional (error syndrome) components in its upper s codeword symbol positions. Equation (11) shows that the error syndrome E(X) may be categorized as an error pattern of up to s codeword symbol errors.

Thus, as illustrated above with respect to equations (4) through (7) for the case of late stagger, the uplink A observable presented to the uplink A decoder will induce decoder failure with high probability when show-thru from B occurs with early stagger, provided that s>t.

Combining the two results for full length codes, it follows that both early and late staggering will mitigate show-thru, provided that the amount of stagger is greater than t codeword symbols. Note that as s increases, it passes a point which is equivalent to a lesser amount of stagger in the opposite direction. In other words, for example, a late stagger of 200 codeword symbols in a (255, 231) code provides the same benefit as an early stagger of 55 codeword symbols.

The development above establishes that, provided the amount of stagger is sufficient, an uplink decoder is exposed to a number of apparent errors arising from the stagger which renders decoder failure highly probable during show-thru. The preceding description, however, assumed that the length of the codeword was $n=(2^{\wedge}v)-1$, the maximum length for a Reed-Solomon codeword over a $(2^{\wedge}v)$ element Galois Field $(GF(2^{\wedge}v))$.

The present invention is also applicable to shortened codes. In a shortened code, $n<(2^{\wedge}v)-1$. For example, a (236,212) code which corrects up to 12 errors (i.e., t=12) is a shortened version of a (255,231) code with t=12. A shortened codeword may be thought of as having been formed by filling out the high order $(2^\wedge v)-1-n$ terms of the information bytes with zeroes, encoding the result to form a full length codeword, and truncating the result to the (shortened) length n by dropping the zero fill. Thus, in a subsequent decoding process, a decoder need not consider the (assumed zero) high order terms of the shortened codeword.

At the uplink decoder, the received observable may be considered to be filled out with zeroes, decoded, and then the fill discarded. All codewords of a shortened code are also codewords in the full length code; however, not all codewords in the full length code, when truncated to the shortened value of n (e.g., 236), are codewords in the shortened code.

In the shortened case, when stagger is introduced such that the uplink B codewords are s symbols late relative to the uplink A codewords, the uplink A observable is again given by:

$$A_z(X) = B_{z-1,s}(X) * X^\wedge 0 \oplus X^\wedge s * B_z(X) \oplus B_{z,s}(X) * X^\wedge n \quad (4a)$$

Which is the same as equation (4).

Next, the decoding process for the shortened codeword $A_z(X)$ is presented. The decoding discussion below may be supplemented with reference to George C. Clark and J. Bibb Cain, *Error-Correction Coding for Digital Communications*, (Plenum Press, New York) (1981). In particular, Clark and Cain provide a discussion in Chapter 5 of decoding techniques, including the formation of syndromes, the error locator polynomial $\Lambda(X)$, and the error evaluator polynomial $\Omega(X)$. Clark and Cain further provide a discussion of the Chien search and its implementation.

Note that the middle term $X^\wedge s * B_s(X)$ of equation (4a) is a codeword in the full length code (rather than the shortened length code) since it is a shift of $B_z(X)$ with zeroes in the end-around carry. However, in the shortened code, the s high order coefficients of $X^\wedge s * B_z(X)$ do not enter into the determination of the syndrome since they fall into the following decoding window (e.g., decoding window z+1 206, rather than the current decoding window z 204).

Thus, the syndrome formed during the decoding process for the shortened decoder is the same as would be formed by the full length decoder when presented with an observable $X^\wedge s * B_z(X) \oplus B_{z,s}(X) * X^\wedge n$. The term $B_{z,s}(X) * X^\wedge n$ serves algebraically to remove the s high order terms because the syndrome of $X^\wedge s * B_z(X)$ is zero for the full length code.

In a full length decoder, the syndrome results in error locator and error evaluator polynomials ($\Lambda(X)$ and $\Omega(X)$) that reflect the probable presence of errors in the s positions n through n+s-1. Because the process of forming $\Lambda(X)$ and $\Omega(X)$ from the syndrome is the same for the full length decoder and for the shortened decoder, the same polynomials will be derived in either case.

However, the Chien search portion of the decoding process is typically restricted to positions 0 through n-1 for a shortened codeword. Thus, the related roots of $\Lambda(X)$ at locations with index of n or higher, are not encountered in the decoding process. Decoder failure occurs because the number of roots of $\Lambda(X)$ found in the search does not match the degree of $\Lambda(X)$. Generally, decoder failure will occur in the shortened case as long as not all s terms of $B_{z,s}(X)$ are zero. If the s coefficients of $B_{z,s}(X)$ are independent, equally likely, random variables, then the probability that all s are zero is $(2^\wedge -v)^\wedge s$, which is small for large s.

In the preceding discussion, the effect of the term $B_{z-1,s}(X) * X^\wedge 0$ in equation (4a) was ignored. In actuality, this term will also influence the calculation of $\Lambda(X)$ and $\Omega(X)$ to reflect the apparent presence of the error $B_{z-1,s}(X) * X^\wedge 0$ in the low order s positions of the shortened codeword. Similarly, the decoder would attempt to expurgate these errors but would experience decoder failure regardless for the reasons set out in the preceeding discussion.

As an example, assume that s=4 with a (236,212) (shortened) Reed-Solomon code. Then, there will typically be 4 apparent errors in the low order positions (0, 1, 2, 3) and the syndrome will be the same as that for the (255, 231) code with another 4 errors in the high order positions (236, 237, 238, 239). Thus, the syndrome formed for the shortened code will match that for the full length code with errors at the stated locations and the resultant $\Lambda(X)$ will be a polynomial of degree 8.

Because t=12, the error patterns located by $\Lambda(X)$ would ordinarily be well within the decoding capability of the code. However, the decoder for the shortened code, knowing it is decoding a shortened code, restricts its search for roots to positions 0 through 235 and will, therefore find only 4 roots rather than the 8 required for a valid decode. This results in decoder failure and the discard of the show-thru from B.

The situation is similar for shortened codes where the stagger has the opposite sense. In other words, the same results hold when the uplink B epoch z codeword is s symbols early relative to the uplink A decoding window.

It is significant to note that the degree of protection against show-thru afforded by the invention is essentially independent of the amount of CCI. In other words, the present invention does not depend in any way on the show-thru being small but only on the fact that the staggering generates, with high probability, more than t errors in an observable (or even a single error in high order codeword symbol positions assumed zero for a shortened code).

The present invention may be easily implemented in practice, because only the same-color uplink beams of the satellite's coverage area need use burst windows that are mutually sufficiently staggered. Because each beam's uplink timing may be independently phased relative to all other beams, this is of little or no impact. Furthermore, at the satellite, the uplink beam receivers may used phased timing similar to that on the ground to provide staggered reception windows.

As one example of assigning stagger to uplink beams, consider a reuse plan using 64 beams with four colors. There are then 16 same-color beams for each of the four colors. For the (236, 212) code described above with t=12, each beam of a particular color may be staggered (236/16)=14 codeword symbols relative to any neighboring beam that may induce show-thru. As shown above, with this amount of stagger, show-thru is effectively mitigated.

Figure 3:
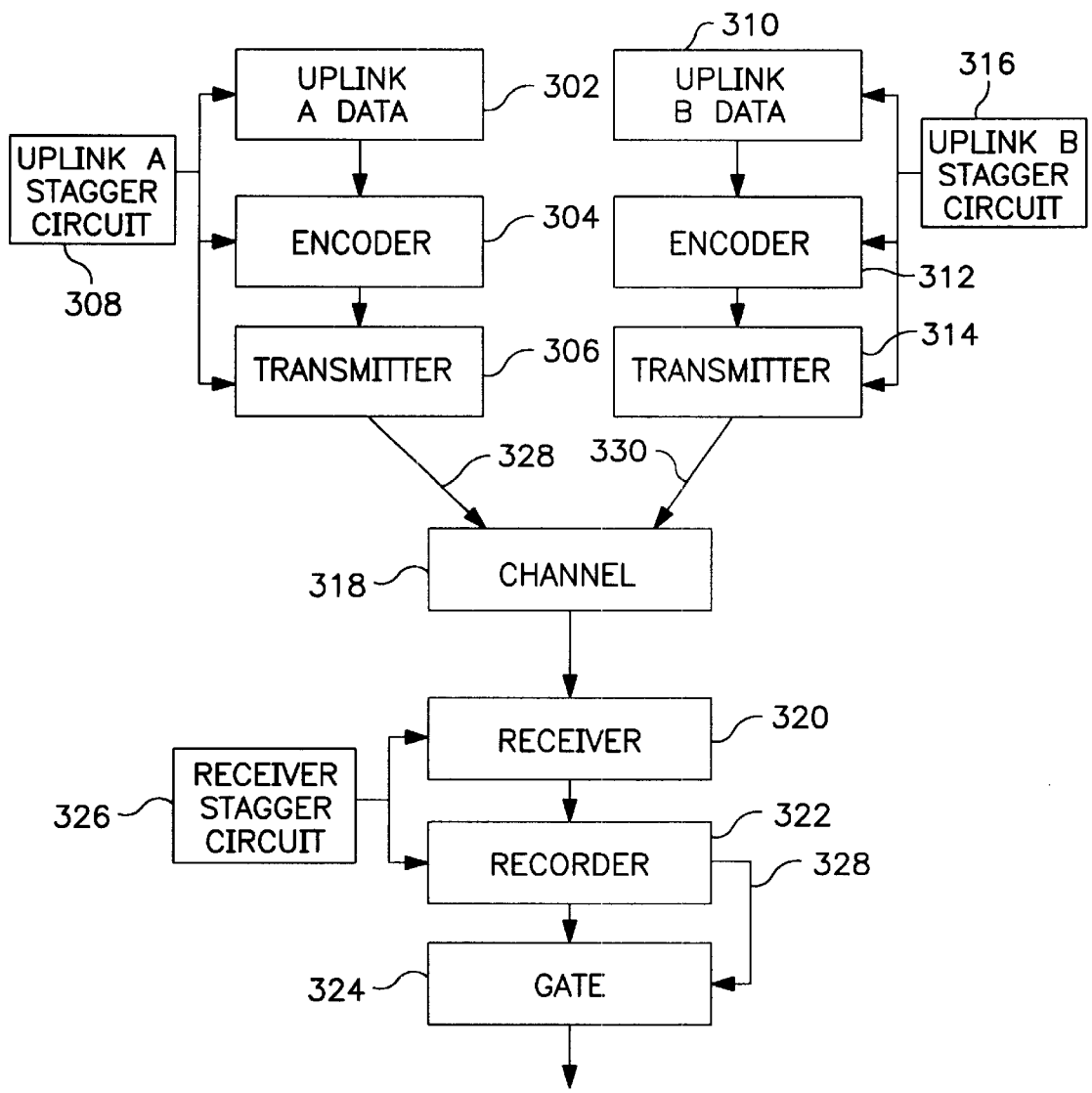
FIG. 3 illustrates a high-level transmitter and receiver hardware block diagram for implementing staggered uplinks according to the present invention.

Turning now to FIG. 3, a communication system 300 is shown that may be used to implement staggering. The communication system 300 includes, generally on the ground, an uplink A data input 302, an uplink A encoder 304, an uplink A transmitter 306, and the uplink A stagger circuit 308. Similarly, for an uplink B, the communication system includes an uplink B data input 310, an uplink B encoder 312, an uplink B transmitter 314, and the uplink B stagger circuit 316. At a receiver for the uplink A, for example, signals transmitted over the channel 318 are received and processed using a receiver 320, an uplink A decoder 322, a gate circuit 324, as controlled by the receiver stagger circuit 326.

With respect to the uplink A 328, the uplink A data 302 arrives for transmission and may be stored in a buffer or the like. The uplink A coder 304, for example, a (236, 212)

Reed-Solomon coder (optionally followed by an inner coder), produces coded uplink A data for transmission by the uplink A transmitter 306. The uplink A stagger circuit 308 may include clocks, for example, that control the clocking of data into the uplink A encoder 304, the clocking of the uplink A encoder 304, or the clocking of the uplink A transmitter 306 to introduce a predetermined amount of stagger in the uplink A 328.

The stagger circuits 308, 316, 326, in general, may be implemented in numerous ways. As noted above, the stagger circuits may generate or control clock signals. As another example, the stagger circuits (or any of the elements shown in FIG. 3) may by incorporated into a single DSP, ASIC, or the like, and may comprise discrete circuitry that controls the encoders, decoders, transmitters, or receivers, for example, to introduce the appropriate stagger values in the uplinks.

Similarly, the uplink B coder 312, produces coded uplink B data for transmission by the uplink B transmitter 314. The uplink B stagger circuit 316 may control the clocking of data into the uplink B encoder 312, the clocking of the uplink B encoder 312, or the clocking of the uplink B transmitter 314 to introduce a predetermined amount of stagger in the uplink B 330. As noted above, the uplink A stagger and the uplink B stagger differ, preferably, by more than t codeword symbols to prevent with near certainty successful decoding of show-thru data.

After the uplink A 328 and the uplink B 330 travel through the channel 318, one or both are received by the receiver 320. In FIG. 3, the receiver 320 is assumed to be associated with the uplink A. Thus, the receiver stagger circuit 326 may introduce the stagger associated with the uplink A on the ground. This may be accomplished, for example, by clocking the uplink A decoder 322 or the uplink A receiver 320 to create or decode the appropriate decoding window for the uplink A.

Note that the uplink A decoder 322 includes a decoder failure output 328. The decoder failure output 328 is asserted during decoder failure and deasserted otherwise. The gate circuit 324 may then include a decoder failure input and either pass or discard decoded uplink A data depending on the state of the decoder failure signal.

Figure 4:
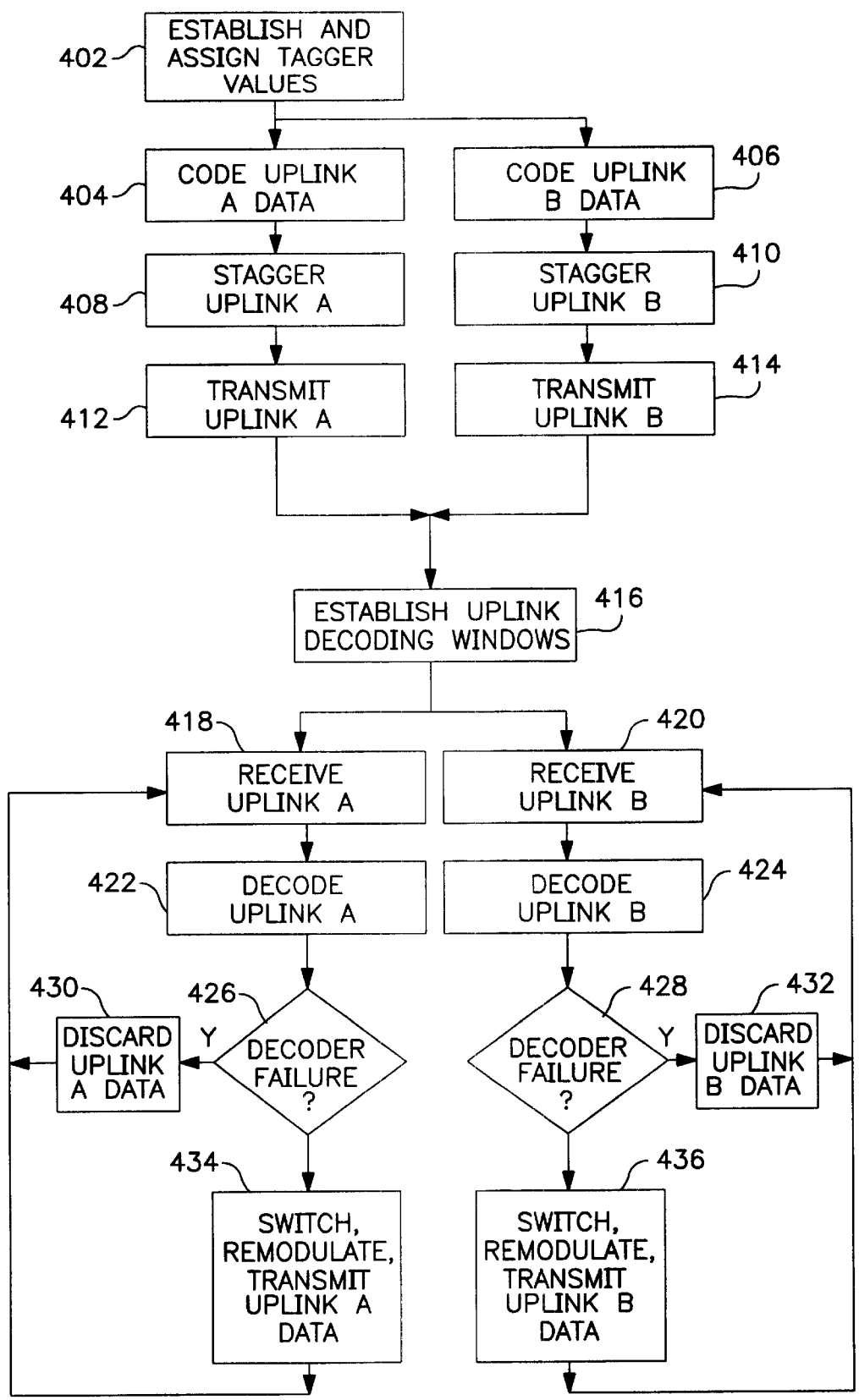
FIG. 4 depicts a high level flow diagram of uplink transmission and reception according to the present invention.

Turning now to FIG. 4, that figure illustrates a high level flow diagram 400 of one implementation of a staggering method according to the present invention. FIG. 4 generally shows the steps performed on the ground, including a stagger establishment step 402, coding steps 404, 406, staggering steps 408, 410, and transmission steps 412, 414.

The diagram 400 also shows the steps occurring at a receiver, (e.g., a satellite), including a window establishment step 416, receiving steps 418, 420, decoding steps 422, 424, and decoder result steps 426, 428. Discarding steps 430, 432, and retransmission steps 434 and 436 are also illustrated.

At the stagger establishment step 402, stagger values are determined, for example, at a Network Operation and Control Center (NOC). The NOC may then distribute the stagger values to individual UETs for implementation in the uplink clocks or other uplink control circuits. At coding steps 406 and 408, one or more UETs encode uplink A data and uplink B data, for example using a Reed-Solomon code, optionally followed by an inner code. At the staggering steps 408 and 410, the staggering relationship is established for each uplink, for example, by performing an initial delay of the stagger value for each given uplink. Subsequently, the scrambled uplink A and B data are transmitted in an uplink A and an uplink B at transmission steps 412 and 414, respectively.

At the receiver, the appropriate uplink decoding windows are established according to the stagger values noted above. The uplink A and the uplink B are received at steps 418, 420 (for example, by one or more antenna onboard a satellite). Typically, the signals received in the uplink A and B are subjected to demodulation and additional processing (not shown) to generate baseband uplink A data and uplink B data.

The uplink A data and the uplink B data are applied to decoders at the decoding steps 422 and 424 which generate decoded A data and decoded B data, respectively. As noted above, decoder failure results with very high probability because of staggering during show-thru (and, in general, whenever more than t errors are present in the data input to the decoder). At decision steps 426 and 428, the receiver checks for decoder failure, and if asserted, discards the decoded A or B data. Processing continues at the reception steps 416, 418.

On the other hand, the absence of decoder failure is an extremely good indication that, as the case may be, the decoded A data or the decoded B data is correct data intended to be received by the uplink A receiver or the uplink B receiver. Thus, at retransmission step 434, the resultant correct decoded A data may be switched, recoded, remodulated, and retransmitted to any appropriate destination. Similarly, at retransmission step 436, the resultant correct decoded B data may be switched, recoded, remodulated, and retransmitted to any appropriate destination.

Note that the decoding window for the uplink A may encompass partially noise or part or all of the overhead portion of bursts in the uplink B that are showing-thru. The case where part of the uplink A decoding window is overlapped by noise or by burst overhead is similar and the same coding properties that are effective with full overlap are applicable as discussed above. The effectiveness of the invention is not dependent on the level of show-thru (in terms of the resultant signal to noise ration) since it depends only on the property of a Reed-Solomon error control system to recognize, with high probability, a sequence that is beyond its decoding capability. Although not explicitly addressed above, noise will be present; however, since the probability of show-thru decreases with increasing noise level, the stagger method disclosed above is no less effective in terms of mitigating show-thru when noise is present.

The present invention may be efficiently implemented in practice using staggered clocks between uplink processing and transmitting circuitry for same color beams. Furthermore, presently available encoders at the UET and matching decoders at the satellite may be used without modification and therefore blend seamlessly with the scrambling and descrambling of the present invention. With the addition of gate circuitry responsive to decoder failure indicators, the present invention greatly reduces show-thru with minimal impact on cost or complexity of a communication system.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for detecting show-thru in an uplink A due to an uplink B at a satellite receiver, the method comprising:

storing a plurality of stagger values associated with individual uplinks, including an uplink A stagger value;

establishing an uplink A decoding window according to said uplink A stagger value;

receiving cyclic error correction coded uplink A signals present at an uplink A receiver; and decoding said uplink A signals to generate decoded uplink A data.

2. The method of claim 1, wherein said step of storing comprises storing a stagger value for each same color uplink in a predetermined reuse pattern.

3. The method of claim 1, wherein said decoding step further comprises the step of generating a decoder failure signal.

4. The method of claim 3, further comprising the step of discarding said decoded uplink A data when said decoder failure signal is asserted.

5. The method of claim 4, further comprising the step of accepting and relaying onward said decoded uplink A data when said decoder failure signal is unasserted.

6. The method of claim 4, wherein said step of decoding comprises Reed-Solomon decoding capable of correcting t errors.

7. The method of claim 6, wherein said step of decoding comprises decoding with a full length Reed-Solomon code.

8. The method of claim 7, wherein said storing step further comprises storing a plurality of stagger values differing by at least t codeword symbols and associated with individual uplinks.

9. The method of claim 6, wherein said step of decoding comprises decoding with a shortened Reed-Solomon code.

10. The method of claim 9, wherein said storing step further comprises storing a plurality of stagger values differing by at least one codeword symbol and associated with individual uplinks.

11. A method for minimizing the number of decoded co-channel interference affected signals decoded at a receiver, the method comprising:

coding signals from a first individual uplink using a cyclic error correction code;

coding signals from a second individual uplink using a cyclic error correction code; and receiving signals from said first uplink at a first time;

receiving signals from said second uplink at a second time difference from said first time, wherein said first time and said second time are individually assigned to said first uplink and said second uplink.

12. The method of claim 11 further including the step of detecting a co-channel interference affected signal at a receiver.

13. The method of claim 12 further including the step of discarding a detected co-channel interference affected signal before decoding said co-channel interference affected signal.

* * * * *